United States Patent [19]

Suga et al.

[11] 4,450,018

[45] May 22, 1984

[54] FUSED FLUX FOR INCLINED SUBMERGED ARC WELDING

[75] Inventors: Katsuyuki Suga; Toyofumi Kitada; Yutaka Naganawa; Hirotaka Nakagawa, all of Yokohama, Japan

[73] Assignee: Nippon Kokan Kabushiki Kaisha, Tokyo, Japan

[21] Appl. No.: 482,614

[22] Filed: Apr. 6, 1983

[30] Foreign Application Priority Data

Apr. 9, 1982 [JP] Japan .................... 57-58020

[51] Int. Cl.$^3$ .................... B23K 35/34; C22B 9/10
[52] U.S. Cl. .................... 148/26; 75/257
[58] Field of Search .................... 148/26; 75/257

[56] References Cited

U.S. PATENT DOCUMENTS 4,367,394 1/1983 Sakai .................... 148/26

Primary Examiner—Peter D. Rosenberg
Attorney, Agent, or Firm—Moonray Kojima

[57] ABSTRACT

When the invented flux is applied to an inclined welding, especially high speed welding of more than 3 m/min of a spiral welded pipe, desired shapes of beads may be obtained without creating so-called under-cut or excessive concave, whereby speed-up of the welding could be expected in the spiral seam, so that the producing efficiency is exactly increased in the spiral welded steel pipe production.

2 Claims, 4 Drawing Figures

Under - cut

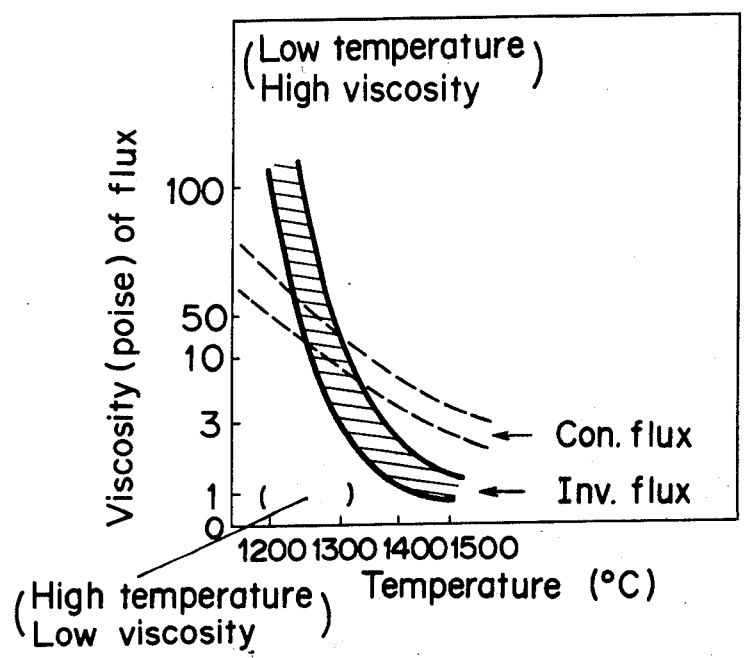
FIG_1
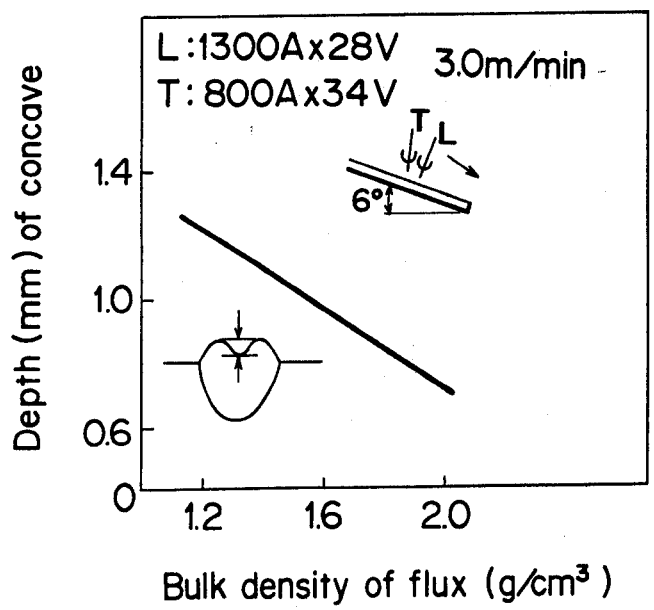
FIG_2

FIG_3
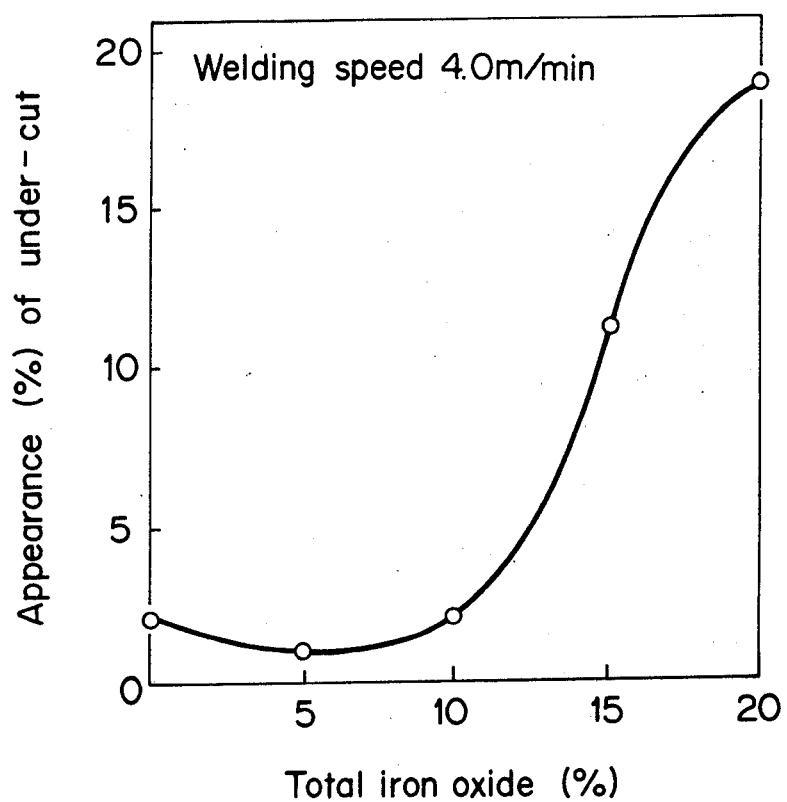
FIG_4
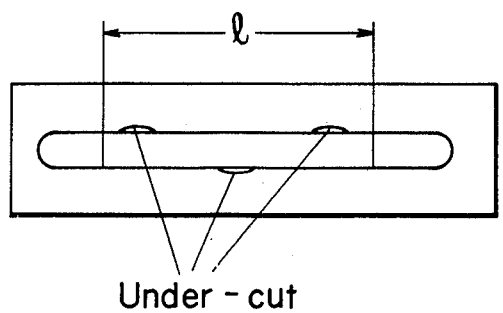

FUSED FLUX FOR INCLINED SUBMERGED ARC WELDING

BRIEF DESCRIPTION OF THE INVENTION

This invention relates to fused flux for inclined submerged arc welding.

The submerged arc welding process may be carried out at high speed since it has employed multi-electrodes and large electric current and it has been widely applied to concerned fields because of its most excellent and efficient work. One of the applicable fields is a seam welding for producing spiral welded pipes. In this production, the seam welding speed directly effects the pipe-making efficiency, and many investigations have been made to speed-up.

The speed-up of the seam welding by the submerged arc welding is obstructed by appearance of under-cut and excessive concave (depression at center of the bead) in the inside bead. As a countermeasure to check such defects, developments have been made to the welding method per se and the fused flux for the inclined high speed welding.

However since the former controls arc directions by acting an external magnetic field to the arc, a means is specially provided for moving the arc so that the welding work is resulted with inconvenience in complicated treatment.

On the other hand, the latter does not invite such inconvenience in handling. This kind of the conventional fused flux has been invented for a descending inclined welding where the welding speed is comparatively slow and not more than 2.5 m/min, and the latter has only an effect for checking concave easily occurring in the descending inclined welding bead, and could not be used in the high speed welding of the spiral welded pipes.

That is to say, the speed-up is more expected at the present time in a case which operates at rate of more than 3 m/min the welding of the spiral welded pipe having thickness of 9 to 12 mm. If the welding were undertaken at such rate in the descending inclined position on the inside of the pipe, a molten pool would be formed from a point just below a welding electrode to a steep descending position and the molten steel flows from this position to the welding electrode by gravity force, and this phenomena could not be controlled only with properties of the foregoing flux and slag so that beads having large concave and overlapping are formed. In order to prevent the concave and overlapping, the welding position should be changed to the ascending inclined position in the high speed spiral welding of more than 3 m/min. The siral welding in this case is not only the descending inclined welding, and the molten pool lies from ascending to descending position on the inside of the pipe. Therefore the backward flow of the molten steel in vicinity of the arc becomes rapid by the gravity force where an under-cut is easily formed. The backward flow cannot be controlled by the conventional inclined welding flux.

The present invention has been developed through many investigations to remove disadvantages involved in the conventional fused flux of the submerged arc welding, and this invention is to provide a fused flux for the inclined submerged arc welding, which may form desired beads without under-cut and excessive concave at spiral welding rate of more than 3 m/min.

For accomplishing this object, the invention proposes a fused flux comprising main composition of $Al_2O_3$ 20 to 30 wt%, $SiO_2$ 15 to 30 wt%. MnO 15 to 30 wt%, $TiO_2$ 10 to 25 wt% and total iron oxide (FeO and $Fe_2O_3$) not more than 10 wt%.

The invention is the fused flux of high $Al_2O_3$—$SiO_2$—$TiO_2$—MnO to be used in the inclined submerged arc welding of the spiral welded pipe at rate of more than 3 m/min, and comprising $Al_2O_3$ 20 to 30 wt%, $SiO_2$ 15 to 30 wt%, MnO 15 to 30 wt%, $TiO_2$ 10 to 25 wt%, (MnO+$TiO_2$) 20 to 35 wt%, total iron oxide (FeO and $Fe_2O_3$) not more than 10 wt%, and the rest being CaO, $CaF_2$ and MgO 1 to 8 wt%, respectively.

BRIEF DESCRIPTION OF THE DRAWINGS

FIG. 1 is a graph showing schematically viscosity of characteristics of this invention and conventional flux, FIG. 2 is a graph showing relation between bulk density of the flux and depth of concave of welded bead, FIG. 3 is a graph showing relation between the amount of total iron oxide in the flux while spiral welding is undertaken, and rate of under-cut, and FIG. 4 is an explanatory view showing calculation of the rate of under-cut.

DETAILED DESCRIPTION OF PREFERRED EMBODIMENT OF THE INVENTION

A reference will be made to reasons for defining the composition of the present flux.

$Al_2O_3$ gives viscosity characteristics as shown in FIG. 1 schematically to the flux in association with $SiO_2$, and is important to give the flux having anti-undercut property and anti-concave property. Therefore the addition should be more than 20% for providing said characteristics. If exceeding 30%, the melting point of the flux is too high and causes deterioration of the slag detachability and the bead surface qualities. Therefore the optimum range is 20 to 30%.

$SiO_2$ is a so-called slag former and it should be at least 15% in the flux. If exceeding 30%, said viscosity characteristics are lost and welding metal toughness is deteriorated. For this reason, it should be set 15 to 30%.

MnO and $TiO_2$ respectively supply Mn and Ti to the weld metal, and play metallurgical roles of controlling shapes of inclusions or fine making weld metal microstructure and increasing bulk density of the flux by concurrently adding MnO and $TiO_2$, and as shown in FIG. 2 decreasing depth of the concave in the descending inclined welding bead. If MnO is less than 15%, it could not expect the effect of increasing the bulk density and the slug layer is not uniformly formed. If MnO is more than 30%, the bulk density is too high and slag inclusion and the under-cut are easily created. Therefore the preferable range of MnO is 15 to 30%.

On the other hand, if $TiO_2$ is less than 10%, the bulk density of the flux is so low that the molten metal flows easily and the welding becomes unstable. If it exceeds 25%, the bulk density is too high, defects would occur as seen in MnO. Thus TiO is preferable in 10 to 25%. If MnO and $TiO_2$ are too much added, the bulk density is too high, and therefore it is preferable that total of MnO and $TiO_2$ is not more than 40%, especially 20 to 35%.

Total iron oxide is FeO and $Fe_2O_3$, and has characteristic to control concave and improve the bead shape with small amount. If it were more than 10% in the flux, the slag adhesion would occur, and it should be not more than 10%.

One example was made of Al₂O₃ 25%, SiO₂ 26%, MnO 19%, TiO₂ 17%, CaO 1%, CaF₂ 4%, MgO 3% and total iron oxide with variations of not more than 20%, and the inclined submerged arc weldings of the spiral welded pipes were undertaken at the welding speed of 4 m/min. FIG. 3 shows the rate of the under-cut at said welding. Due to the high speed up to 4 m/min, the under-cut is formed, but in the range of the total iron oxide being not more than 10% the under-cut is lowered and in vicinity of 5% (4 to 6%) the most preferable results were obtained. From such viewpoint it is added not more than 10%.

With respect to other elements, CaO, CaF₂ and MgO are each required at least 1% for increasing basicity and increasing deoxidation of the flux. However if exceeding 8%, surface defects such as pockmark or pit in regard to CaO and MgO easily occur, and the concave of the bead is made large in depth owing to exceeding fluidity in regard to CaF₂. Therefore each of them should be 1 to 8%.

A further reference will be made to Examples.

EXAMPLES

I The fluxes of the invention listed in Table 1 were applied to the welding on the inside surface of the spiral welded pipe of 12 mm t×1016 mmOD under the welding conditions of the leading electrode: 1600 A×28 V×3.5 m/min, the trailing electrode: 950 A×36 V×3.5 m/min and the distance between the electrodes: 22 mm.

TABLE 1

|  | Fluxs | Al₂O₃ | SiO₂ | MnO | TiO₂ | Total iron oxide | CaO | CaF₂ | MgO |
|---|---|---|---|---|---|---|---|---|---|
| Invented fluxs | A | 25 | 26 | 19 | 17 | 5 | 1 | 4 | 3 |
|  | B | 30 | 15 | 20 | 15 | 10 | 2 | 4 | 4 |
|  | C | 30 | 20 | 19 | 22 | 4 | 1 | 1 | 3 |
|  | D | 25 | 28 | 20 | 18 | 5 | 1 | 2 | 1 |
| Conventional fluxs | E | 1 | 45 | 45 | 0 | 2 | 1 | 4 | 2 |
|  | F | 5 | 41 | 28 | 9 | 0 | 11 | 5 | 1 |
|  | G | 4 | 53 | 0 | 1 | 0 | 26 | 7 | 9 |

II The cross sectional shapes of the beads, depth of the concaves and the rate of the under-cut obtained by the above mentioned conditions, are shown in Table 2. The rate of the under-cut was obtained with an expression of Rate (%) of under-cut=(ΣΔl)/2133 100 herein, l(mm): length of bead

ΣΔl(mm): total length of under cut

TABLE 2

|  | Fluxs | Shapes of beads | Depth of concave | Rate of undercut | Total evaluation |
|---|---|---|---|---|---|
| Invented fluxs | A | — — | 0.3 mm | 0% |  |
|  | B | — — | 0.6 mm | 0 |  |
|  | C | — — | 0 | 0 |  |
|  | D | — — | 0 | 0 |  |
| Conventional fluxs | E | — — | 0.7 mm | 63% | X |
|  | F | — — | 2.3 mm | 0 | X |
|  | G | — — | 0 | 100 | X |

As is seen from Table 2, depending upon the flux of the invention, there scarcely occur the under-cut and the excessive concave in spite of the high speed welding up to 3.5 m/min, and desirable shape in cross section of the bead could be obtained in comparison with the conventional fluxs.

The conventional flux G does not result in the excessive concave but is high in rate of the under-cut. The flux F does not make the nuder-cut but is large in depth of the concave. Concerning the flux E, the concave is rather small but the under-cut is large.

When this invented flux is applied to the inclined welding, especially the high speed welding of more than 3 m/min of the spiral welded pipe, the desired shapes of the beads may be obtained without creating the under-cut of the excessive concave whereby the speed-up could be realized in the spiral seam welding, so that the producing efficiency is exactly increased in the spiral welded pipe production.

What is claimed is:

1. Fused flux for inclined submerged arc welding, consisting essentially of Al₂O₃ 20 to 30 wt%, SiO₂ 15 to 30 wt%, MnO 15 to 30 wt%, TiO₂ 10 to 25 wt% and total iron oxide (FeO and Fe₂O₃) not more than 10 wt%.

2. Fused flux for inclined submerged arc welding, consisting essentially of 20 to 30 weight % Al₂O₃; 15 to 30 weight % SiO₂; 15 to 30 weight % MnO; 10 to 25 weight % TiO₂, total iron oxide comprising FeO and Fe₂O₃ not more than 10 weight percent; and 1 to 8 weight percent CaO, CaFe and MgO.

* * * * *

UNITED STATES PATENT AND TRADEMARK OFFICE
CERTIFICATE OF CORRECTION

PATENT NO. : 4,450,018
DATED : May 22, 1984
INVENTOR(S) : Katsuyuki SUGA; Toyofumi KITADA; Yutaka NAGANAWA and Hirotaka NAKAGAWA It is certified that error appears in the above—identified patent and that said Letters Patent is hereby corrected as shown below:

Column 3, line 52 should read as follows

--- Rate (%) of under-cut = $(\Sigma \Delta \ell)/2(\ell) \times 100$ ---.

Signed and Sealed this

Twenty-sixth Day of February 1985

[SEAL]

Attest:

DONALD J. QUIGG

Attesting Officer     Acting Commissioner of Patents and Trademarks